UNITED STATES PATENT OFFICE.

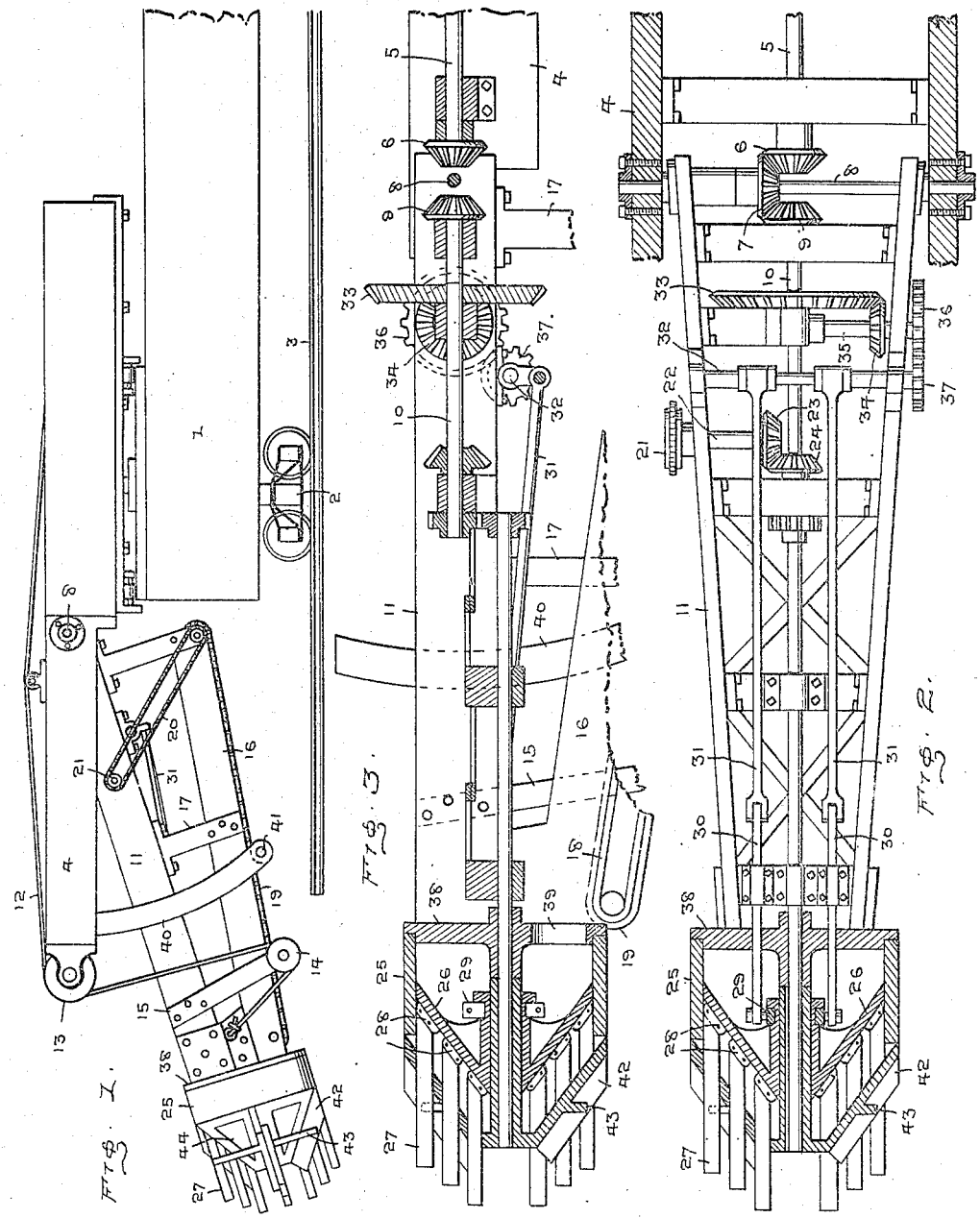

JOHN W. COOK, OF MIAMI, FLORIDA, ASSIGNOR OF ONE-THIRD TO GEORGE A. WALDECK, OF MIAMI, FLORIDA.

TUNNELING-MACHINE.

1,172,876.  Specification of Letters Patent.  Patented Feb. 22, 1916.

Application filed July 30, 1914. Serial No. 854,135.

*To all whom it may concern:*

Be it known that I, JOHN W. COOK, a citizen of the United States of America, residing at Miami, in the county of Dade and State of Florida, have invented certain new and useful Improvements in Tunneling-Machines, of which the following is a specification, reference being had therein to the accompanying drawing.

This invention relates to tunnel boring machines and has for its object the production of a simple and efficient machine for actuating the boring head and also conveying the material from the boring head after the material has been cut thereby.

Another object of the invention is the production of a simple and efficient means for simultaneously rotating and reciprocating the cutting head for the purpose of constituting an efficient boring mechanism.

With these and other objects in view this invention consists of certain novel combinations, constructions, and arrangements of parts as will be hereinafter fully described and claimed.

In the accompanying drawings:—Figure 1 is a side elevation of the machine partly broken away, Fig. 2 is an enlarged bottom plan view partly in section of the boring head carrying frame, and Fig. 3 is a longitudinal central section through the carrying frame and parts attached thereto.

By referring to the drawings it will be seen that 1 designates a supporting body for the tunneling mechanism which is supported upon the usual truck 2, which truck travels upon the rails 3.

Mounted upon the supporting body 1 in any suitable manner and rotatable thereon is a crane or derrick 4 which may be of any preferred structure and is designed for supporting my improved form of tunneling device. A driving shaft 5 is rotatably mounted upon the crane 4 and is driven from any suitable source and carries a beveled gear 6 at its forward end which meshes with a beveled gear 7 carried by a supporting shaft 8. This gear 7 also meshes with a gear 9 carried by the head actuating shaft 10. A forward head carrying frame 11 is pivotally mounted upon the shaft 8 as illustrated clearly in Fig. 2. This forward head carrying frame 11 may be raised and lowered since the same is pivotally mounted upon the shaft 8. Cables 12 pass over the guiding pulleys 13, said pulleys being carried by the forward ends of the crane or derrick 4 and below the pulleys 14 carried by the pulley carrying arms 15 of the forward head boring frame and are secured to the forward end of the head boring frame to facilitate the raising and lowering of the frame by means of the cables 12.

The forward head boring frame comprises a plurality of parallel beams which are reinforced by suitable braces. A conveyer frame 16 is suspended below the forward head boring frame by means of hanger brackets 17 and a conveyer belt 18 is carried thereby and driven by means of a sprocket chain 19, which chain is in turn driven by means of a sprocket chain 20 carried over a sprocket wheel 21 carried by a shaft 22. This shaft 22 has a gear 23 thereon which meshes with a gear 24 carried by the shaft 10 and this shaft 10 carries a rotating head 25 at its forward end.

The rotating head 25 carries a reciprocating head 26, which head carries a plurality of digger fingers 27 being connected to the head 26 by means of the connecting plates 28. A band or collar 29 is carried by the head 26 and this band is connected to the reciprocating rods 30 which are in turn connected to the crank arms 31. These arms 31 are connected to the crank shaft 32, which crank shaft is driven through the means of a gear 33 on the shaft 10 which meshes with a gear 34 on a stub shaft 35, the outer end of the shaft 35 having a cog 36 thereon which meshes with a pinion 37 fixed to the crank shaft 32, said cog and pinion being exteriorly of the frame 11. The head 25 is supported upon a disk 38, which disk is provided with an aperture 39 for the purpose of allowing the cut material to pass through the cutting head and be delivered to the forward conveyer belt 18 carried by the forward digger head carrying frame.

The operation of the device is as follows: The body 1 is brought to the desired position upon the rails 3 and the frame 11 is swung to the position shown in Fig. 1, and the crane 4 swung to the desired angle relative to the body 1. After the crane 4 and the body 1 are in the desired position and the shaft driving engine started, the shaft 5 will rotate the shaft 10 above described and the head 25 carried thereby. The cutting fingers 27 will also be reciprocated through the head due to the operating mechanism above described, and the cables 12 will be operated to cause the cutting head to be slightly elevated while accomplishing the cutting function described therefor. In the meantime the conveyer 18 will be caused to travel through the medium of the sprocket chains 20 and 19 and the cut material which is cut by the head 25 will be forced through the aperture 39 onto the conveyer belt 18 and is carried by the conveyer belt 18 to any suitable point.

As is illustrated in Fig. 1, the crane 4 carries depending arms 40, said arms carrying a roller 41 illustrated in dotted lines in Fig. 1 which extends transversely under the conveyer frame 16 for limiting the downward movement thereof.

Cutting blades 42 are carried by the cutting head 25, and a web portion 43 extends through the cutting blades 42 as is illustrated in Fig. 2. It should be understood that the cutting fingers 27 project through the cutting blades 42 and that the cutting head 25 is provided with openings 44 to allow the passage of dirt or cut material therethrough to be delivered upon the conveying belt 18. The reciprocating head 26 comprises a plurality of diverging arms, which arms support the cutting fingers 27. These diverging arms extend in the rear of the cutting blades 42 carried by the rotating head 25.

Having thus described the invention what is claimed as new, is:—

1. A machine of the class described comprising a support, a cutting frame carried thereby, a cutting head, said cutting head comprising a plurality of diverging cutting plates, a plurality of cutting fingers reciprocally mounted upon said cutting head, a reciprocating head supporting said fingers and comprising a plurality of diverging spaced arms, said cutting head provided with an opening formed in the rear thereof and a conveyer positioned in the rear of said cutting head for conveying cut material from said cutting head.

2. A rotary cutting device, comprising the combination with a disk, and means to carry the same, of a hollow cutter head having inclined integral arms, said arms having a plurality of sockets therethrough, means to rotatably attach the cutter head to the disk, a tool holder reciprocatingly mounted in the cutter head, tools carried by the tool holder adapted to extend through the sockets in the arms of the tool holder, and means to reciprocate said tool holder to move the tools into and out of engagement with an object.

3. A cutting device, comprising a disk, a cutter head, means to rotatably attach the cutter head to the disk, a tool holder within said cutter head, a plurality of cutting tools carried by the tool holder, means to guide said cutting tools, a grooved head on the tool holder, a collar engaging the groove in said head, means attached to said collar to reciprocate said tool holder, and means to rotate the cutter head and tool holder independently of the disk.

4. In a cutting device, the combination with a disk having a discharge opening therein, of a hollow cutter head, a tool holder reciprocatingly mounted within said cutter head, said tool holder comprising integral arms, said arms having their outer faces tapered, a head on the tool holder having a tapered end, and means engaging said head to operate the tool holder.

In testimony whereof I hereunto affix my signature in presence of two witnesses.

JOHN W. COOK.

Witnesses:
J. W. EVAN,
MARY A. NALL.

Copies of this patent may be obtained for five cents each, by addressing the "Commissioner of Patents, Washington, D. C."